United States Patent [19]

Lieber et al.

[11] Patent Number: 4,606,835

[45] Date of Patent: Aug. 19, 1986

[54] SALT COMPOSITION HAVING SMALLER SIZED SODIUM METASILICATE

[75] Inventors: Alfred Lieber, Salt Lake City; Jack L. Simper, Murray, both of Utah

[73] Assignee: Chemopharm Laboratory, Inc., Salt Lake City, Utah

[21] Appl. No.: 685,246

[22] Filed: Dec. 21, 1984

[51] Int. Cl.$^4$ ................................................ C08K 3/18
[52] U.S. Cl. ...................................... 252/70; 252/74; 252/78.3; 106/13
[58] Field of Search .................... 252/70, 74, 78.3; 106/13; 23/313 AS; 423/326

[56] References Cited

U.S. PATENT DOCUMENTS

| | | | |
|---|---|---|---|
| 1,141,446 | 6/1915 | Cew | 252/70 |
| 1,825,151 | 9/1931 | Keoleian | 252/70 |
| 2,574,763 | 11/1951 | Sears | 252/70 |
| 3,208,822 | 9/1965 | Baker et al. | 23/313 AS |
| 3,285,859 | 11/1966 | Jelen | 252/385 |
| 3,340,018 | 9/1967 | Otrhalek | 23/313 AS |
| 3,490,744 | 1/1970 | Binsley | 252/70 |
| 3,505,234 | 4/1970 | Pinckernelle | 252/70 |
| 3,542,686 | 11/1970 | Miller | 252/70 |
| 3,704,230 | 11/1972 | Loriechio | 252/70 |
| 3,986,969 | 10/1976 | Tekes | 252/70 |
| 3,996,399 | 12/1976 | Vrisakis | 252/385 |
| 4,031,024 | 6/1977 | Vrisakis | 252/89.1 |
| 4,283,297 | 8/1981 | Peters et al. | 252/70 |
| 4,341,649 | 7/1982 | Burn et al. | 252/70 |

FOREIGN PATENT DOCUMENTS 1344958 10/1963 France .
2036062 6/1980 United Kingdom .

OTHER PUBLICATIONS

Deicing Composition: 100 Part Salt, 1 Part Propylene Glycol, 1 Part Diatomaceous Earth, 1 Part Sodium Metasilicate (20-65 mesh), and 9 Part Urea. Chemopharm Lab, prior to 12-21-1983.

Deicing Composition: 100 Part Salt, 1 Part Propylene Glycol, 1 Part Diatomaceous Earth, 1 Part Sodium Silicate (2:1 $SiO_2/NaO_2$, 80% through 100 mesh), and 9 Part Urea. Chemopharm Lab, prior to 12-21-1983.

*Primary Examiner*—Paul Lieberman
*Assistant Examiner*—Hoa Van Le
*Attorney, Agent, or Firm*—Jon C. Christiansen

[57] ABSTRACT

A dry and free-flowing composition containing salt, $C_2$ to $C_6$ monohydric and/or polyhydric alcohol, diatomaceous earth (or suitable substitute) and sodium metasilicate characterized by a particle size smaller than about 80 mesh. The composition is useful for facilitating the melting and removal of snow and ice.

5 Claims, No Drawings

SALT COMPOSITION HAVING SMALLER SIZED SODIUM METASILICATE

I. INTRODUCTION AND BACKGROUND

Our invention relates to a new and useful composition of matter. More specifically our invention relates to a new and useful salt composition.

Salt compositions can be used to facilitate (by lowering melting temperature) the melting and removal of snow and ice from parking lots, streets, driveways, sidewalks and numerous other areas. When used for this purpose, the salt composition is applied over the area covered by snow or ice. The salt composition can also be applied at the beginning of a storm to make snow or ice removal easier.

Salt compositions of this nature typically contain corrosion inhibitors and anticaking agents. The corrosion inhibitors serve to prevent or reduce damage to concrete and other surfaces and materials (for example metal and leather). The anticaking agents prevent or reduce caking of the salt composition and increase its shelf-life.

One known corrosion inhibitor is sodium metasilicate in granular form having a mesh size distribution of 20 to 65 mesh. To be most effective, the sodium metasilicate must be evenly distributed among the salt and in close physical proximity to the salt. A $C_2$ to $C_6$ monohydric or polyhydric alcohol (e.g. propylene glycol) can be added to the composition to cause the sodium metasilicate to stick to the salt. In the absence of the alcohol most of the sodium metasilicate separates and settles to the bottom of the container containing the salt composition. This greatly reduces the effectiveness of the sodium metasilicate as a corrosion inhibitor. Use of a $C_2$ to $C_6$ monohydric or polyhydric alcohol, however, imparts to the composition a wet and sticky feel that is unsatisfactory and adversely impacts upon the marketability of the salt composition as a commercial product. The wet and sticky feel can be eliminated by adding to the salt composition diatomaceous earth (or a similar component). This, however, causes separation and settling of the sodium metasilicate which in turn reduces the effectiveness of the sodium metasilicate as a corrosion inhibitor.

One object of our invention is to counteract the problem of sodium metasilicate separation and settling as described above. Other objects, advantages and aspects of our invention are apparent from a study of this disclosure and the appended claims.

II. BRIEF SUMMARY OF THE INVENTION

The problem of sodium metasilicate separation and settling in a composition containing salt, $C_2$ to $C_6$ monohydric and/or polyhydric alcohol, diatomaceous earth (or suitable substitute) and sodium metasilicate is solved by using sodium metasilicate having a particle size smaller than 80 mesh.

III. DESCRIPTION OF THE INVENTION

The composition of our invention contains salt (sodium chloride), $C_2$ to $C_6$ monohydric or polyhydric alcohol, diatomaceous earth and sodium metasilicate. The composition may optionally include other components such as, for example, sodium ferrocyanide (an anticaking agent) and urea.

The salt can be coarse or fine. It can be in granular form, flake form or in any other form. This invention is not limited by the size or form of the salt.

Suitable $C_2$ to $C_6$ monohydric and polyhydric alcohols include propylene glycol, glycerin, sorbitol, mannitol, propylene alcohol, ethyl alcohol, butyl alcohol and the like. Mixtures of the alcohols may be used. 1,2-propylene glycol is preferred.

Although diatomaceous earth is preferred, any one or more of the following or their equivalents can be used in place of (or along with) diatomaceous earth: calcium silicate, fumed silica, powdered bentonite, talc and starch. Each of the foregoing is within the scope of our invention.

The sodium metasilicate of our invention is characterized by a particle size which is smaller than 80 mesh and preferably smaller than 100 mesh and even more preferably smaller than 200 mesh. Anhydrous sodium metasilicate fines or powder are preferred. The particle size of the sodium metasilicate in a given sample is likely to vary and may contain some sodium metasilicate larger than 80 mesh, the key to our invention, however, being that a sufficient amount of the smaller sized sodium silicate be included in the sample to ensure that sodium metasilicate contact with most or all of the salt is achieved and maintained (i.e. not lost through separation and settling). We prefer that most of the sodium silicate be smaller than 100 mesh and that a substantial portion of the sodium metasilicate be smaller than 200 mesh. A substantial portion would be about 10% or more of the sodium metasilicate.

Although the broadest scope of our invention is not limited thereto, the following guidelines are offered to assist in the practice of our invention and in determining the amount of each component generally used in the inventive composition. As used herein and in the claims, "parts" means parts by weight of the component per 100 parts by weight of salt.

Alcohol. Our guidelines call for less than 10 parts of $C_2$ to $C_6$ monohydric and/or polyhydric alcohol per 100 parts of salt. We recommend less than 4 parts and prefer less than 2 parts of $C_2$ to $C_6$ monohydric and/or polyhydric alcohol. Our guidelines further call for at least 0.1 parts of $C_2$ to $C_6$ monohydric and/or polyhydric alcohol per 100 parts of salt. We prefer at least 0.5 parts of $C_2$ to $C_6$ monohydric and/or polyhydric alcohol. When more than one $C_2$ to $C_6$ monohydric and/or polyhydric alcohol is used, the above guidelines apply to the mixture as a whole.

Diatomaceous earth. Our guidelines call for less than 20 parts of diatomaceous earth per 100 parts of salt. We recommend less than 8 parts and prefer less than 4 parts of diatomaceous earth. Our guidelines further call for at least 0.1 parts of diatomaceous earth per 100 parts of salt. We prefer at least 0.5 parts of diatomaceous earth. The above guidelines also apply when calcium silicate, fumed silica, powdered bentonite, talc and/or starch (or their equivalents) are used in place of (or along with) diatomaceous earth. When a mixture is employed the above guidelines apply to the mixture as a whole.

Sodium metasilicate. Our guidelines call for less than 10 parts of sodium metasilicate per 100 parts of salt. We recommend less than 4 parts and prefer less than 2 parts of sodium metasilicate. Our guidelines further call for at least 0.1 parts and preferably at least 0.5 parts of sodium metasilicate per 100 parts of salt.

Urea. Our guidelines call for less than 40 parts of urea per 100 parts of salt. We recommend less than 20 parts and prefer less than 12 parts of urea. Our guidelines further call for at least 1 part and preferably at least 6 parts of urea per 100 parts of salt. It is noted that although use of urea is preferred, it is an optional component of the inventive composition and not necessary for the practice of our invention.

Sodium ferrocyanide. Our guidelines call for less than 3 parts of sodium ferrocyanide per 100 parts of salt. We recommend less than 1 part and prefer less than 0.2 parts of sodium ferrocyanide. Our guidelines further call for at least 0.01 parts and preferably at least 0.05 parts of sodium ferrocyanide per 100 parts of salt.

| Preferred Amounts | |
|---|---|
| Component | Parts by Weight |
| Salt | 100.00 |
| 1,2 Propylene Glycol | about 1.12 |
| Diatomaceous Earth | about 1.12 |
| Sodium Metasilicate | about 1.12 |
| Urea | about 9.00 |
| Sodium Ferrocyanide | about 0.11 |

IV. EXAMPLES

EXAMPLE 1

The purpose of this example is to demonstrate the advantage of a smaller sized sodium metasilicate. In this example the following sodium metasilicates are employed:

(a) Anhydrous sodium metasilicate granules having a mesh size distribution of 20 to 65 mesh (Uniflow sodium metasilicate pentahydrate available from Diamond Shamrock Chemicals Company)

(b) Anhydrous sodium metasilicate fines. (Drymet fines available from Stauffer Chemical Company)

The sodium metasilicate fines were much smaller than the sodium metasilicate granules. The fines were subjected to a screen analysis which yielded the following results:

| 100% | −60 | (i.e. 100% of the fines passed through a 60 mesh sieve) |
|---|---|---|
| 15% | +80 | (i.e. 15% of the fines were retained by an 80 mesh sieve) |
| 25% | +100 | (i.e. 25% of the fines were retained by a 100 mesh sieve) |
| 40% | +200 | (i.e. 40% of the fines were retained by a 200 mesh sieve) |
| 20% | −200 | (i.e. 20% of the fines passed through a 200 mesh sieve) |

The mesh sieves were standard sieves in accordance with ASTM E11, Aternative Designation.

A salt composition containing the sodium metasilicate granules was prepared and observed as follows. 100 g of coarse grade salt (NaCl) of about −4, +8 mesh was placed into a glass beaker. 1 g of 1,2-propylene glycol (obtained from Dow Chemical Company) was added to the beaker. The contents of the beaker were mixed well with a stick. 1 g of the sodium metasilicate granules were added to the beaker. The contents of the beaker were again mixed with a stick. After mixing, the contents were examined and it was observed that the sodium metasilicate granules were distributed evenly and were sticking to the salt. Separation and settling of sodium metasilicate were not observed. The contents were not free flowing and they had an unsatisfactory wet and sticky feel. Thereafter, 1 g of diatomaceous earth (Celatom FW 14) was added to and mixed with the contents of the beaker. After shaking the beaker its contents were examined and found to be free flowing and without a wet or sticky feel. It was further observed, however, that the sodium metasilicate granules had in substantial part separated from the salt and settled to the bottom of the beaker.

The above experiment was repeated using the sodium metasilicate fines in place of the sodium metasilicate granules in same manner and amounts as set forth above and with the same results except that the sodium metasilicate fines remained substantially evenly disbursed without substantial separation and settling. Thus, use of the smaller sized sodium metasilicate fines allowed production of a dry product having a substantially homogeneous distribution of sodium metasilicate throughout the salt.

Example 2

This example described the preparation of a commercial size batch of the inventive composition. The following components were combined in a one-ton capacity ribbon blender in the amounts and manner set forth below:

| 1778 lb. | Salt |
|---|---|
| 160 lb. | Urea |
| 20 lb. | Sodium Metasilicate Fines |
| 2 lb. | Sodium Ferrocyanide |
| 20 lb. | 1,2-Propylene Glycol |
| 20 lb. | Diatomaceous Earth |

The urea was obtained from Union Chemical Company. The sodium metasilicate fines were of the same kind described in Example 1. The sodium ferrocyanide was obtained from American Cyanamid. The 1,2-propylene glycol was obtained from Dow Chemical Company. The diatomaceous earth was Celatom FW 14.

The salt, urea, sodium metasilicate fines and ferrocyanide were introduced into the blender. The contents were blended for a few minutes until well mixed. While mixing, the 1,2-propylene glycol (preblended with a red dye solution) was slowly added to the blender for homogeneous distribution. After the liquids were well mixed over the dry materials, the diatomaceous earth was added to the blender and mixed well until evenly distributed. Overblending was avoided so as to reduce the breakup of salt particles. The contents of the blender were then packaged and ready for use.

V. CLAIMS

We claim:

1. A dry and free-flowing composition useful for facilitating the melting and removal of snow and ice comprising:
   (a) 100 parts by weight of salt;
   (b) from about 0.5 to about 2.0 parts by weight per 100 parts by weight of salt of a member selected from the group consisting of $C_2$ to $C_6$ monohydric alcohols, polyhydric alcohols, and mixtures thereof;
   (c) from about 0.5 to about 4.0 parts by weight per 100 parts by weight of salt of a member selected from the group consisting of diatomaceous earth, calcium silicate, fumed silica, powdered bentonite, talc, starch, and mixtures thereof; and (d) from about 0.5 to about 2.0 parts by weight per 100 parts by weight of salt of sodium metasilicate characterized by a particle size smaller than about 80 mesh.

2. A composition in accordance with claim 1 wherein (b) is 1,2-propylene glycol and (c) is diatomaceous earth.

3. A composition in accordance with claim 2 wherein (d) is anhydrous sodium metasilicate fines.

4. A composition in accordance with claim 3 herein said composition further comprises (e) urea and (f) sodium ferrocyanide; wherein (e) is within the range of about 6 to about 12 parts by weight per 100 parts by weight of salt; and wherein (f) is within the range of about 0.05 to about 0.2 parts by weight per 100 parts by weight of salt.

5. A composition in accordance with claim 4 wherein most of (d) is smaller than 100 mesh and a substantial portion of (d) is smaller than 200 mesh.

* * * * *